United States Patent [19]

Ubhayakar

[11] Patent Number: 4,848,179
[45] Date of Patent: Jul. 18, 1989

[54] FLEXIDIGIT ROBOTIC MANIPULATOR

[75] Inventor: Shivadev K. Ubhayakar, Rancho Palos Verdes, Calif.

[73] Assignee: TRW Inc., Redondo Beach, Calif.

[21] Appl. No.: 156,256

[22] Filed: Feb. 16, 1988

[51] Int. Cl.[4] .......................... B25J 17/00; B25J 18/06
[52] U.S. Cl. ........................................ 74/479; 901/22; 901/23; 901/28
[58] Field of Search ..................... 74/469, 479; 901/14, 901/15, 21, 22, 23, 27, 28

[56] References Cited

U.S. PATENT DOCUMENTS

| | | | |
|---|---|---|---|
| 3,497,083 | 2/1970 | Anderson | 901/28 |
| 3,712,481 | 1/1973 | Harwood | 74/469 |
| 4,369,814 | 1/1983 | Humphrey | 901/28 |
| 4,393,728 | 7/1983 | Larson et al. | 74/469 |
| 4,494,417 | 1/1985 | Larson et al. | 74/469 |
| 4,607,578 | 8/1986 | Inoue et al. | 248/421 |
| 4,621,965 | 11/1986 | Wilcock | 901/14 |
| 4,651,589 | 3/1987 | Lambert | 74/469 |
| 4,712,969 | 12/1987 | Kimura | 901/14 |
| 4,751,821 | 6/1988 | Birchard | 901/15 |

FOREIGN PATENT DOCUMENTS

| | | | |
|---|---|---|---|
| 8703528 | 6/1987 | European Pat. Off. | 901/28 |
| 768630 | 11/1980 | U.S.S.R. | 901/15 |
| 1202852 | 1/1986 | U.S.S.R. | 901/21 |
| 1238959 | 6/1986 | U.S.S.R. | 901/21 |
| 1283076 | 1/1987 | U.S.S.R. | 901/15 |
| 1286405 | 1/1987 | U.S.S.R. | 901/15 |

OTHER PUBLICATIONS

A., Hemani, *Robotics* 1 (1986) pp. 27–36, "Study . . . Lightweight & Flexible Robot Manipulator".

Primary Examiner—Allan D. Herrmann
Attorney, Agent, or Firm—Ronald M. Goldman; Sol L. Goldstein

[57] ABSTRACT

A multidigit arm contains a plurality of sections, each of which is positionable angularly and spatially to a predetermined degree with respect to an adjacent section. Control means are provided for selectively individually positioning each section within said arm with respect to an adjacent section, such control means including actuator means positioned within and carried by and between the arm sections. The arm may be formed into a variety of curves and position the arm end at a variety of positions.

6 Claims, 3 Drawing Sheets

Fig_5

Fig_6a

Fig_6b

COLD  HOT
Fig_6c

Fig_6d

Fig_6

Fig_7

Fig_8

Fig_9

Fig_10

Fig_11a  Fig_11b  Fig_11c

TIME  t=0      t=8     t=28    t=38
       12a     12b     12c     12d

Fig_12

Fig_13

FLEXIDIGIT ROBOTIC MANIPULATOR

FIELD OF THE INVENTION

This invention relates to controlled mechanical manipulators or positioning devices, and, more particularly, to flexible, articulated robotic arm devices and to systems containing those devices.

BACKGROUND OF THE INVENTION

Robotics has come to denote the implementation of human like activities by machines. This includes robots which have the capability of handling materials analogous to handling by the human appendages, including arms and hands. The robot can be controlled to act according to the operator's direction or by the use of a pre-established program to carry out many mechanical functions that substitute for a human, particularly in environments which are hostile to humans. Outer space is one such hostile environment; extremely cold and in vacuum in which a human could not survive without suitable protection. On Earth hostile environments also exist where a person would be subjected to the ill effects of extreme heat or cold, nuclear radiation, toxic chemical waste, etc. Deep-sea underwater exploration also involves working in an extremely hostile environment, where robotic devices could perform many of the tasks performed by humans in a bathysphere. Even more importantly, the robot can carry out manipulative tasks repeatedly and accurately without tiring. A robotic manipulator forms part of the Robot and performs the manipulative functions.

In an article entitled "Study On a Lightweight and Flexible Robot Manipulator", A. Hemami, Robotics 1 (1985), pages 27 through 36, the subject of a flexible robotic arm, one that can assume a large number of shapes and end positions, is addressed. In the article, sketches of a flexible snake like arm design are presented. The arm contains numerous sections or joints joined together by a bellows like flexible support skin that contains the requisite amount of strength and flexibility to support the sections that the author required. A series of disks border each joint and each disk contains centrally located triangular shaped openings. The disks are supported by the flexible sheath skin that both covers internal elements and is an important part of the structures support. At least three strings are attached to spaced locations on each disk and extend through the triangular shaped passage to the rear of the arm.

Hemami intends for each section to be manipulated remotely by positioning or tugging of the strings, much like a puppeteer controls a puppet's arms and legs. However, unlike manipulating a puppet, in the suggested manipulator structure, movement of any one joint section appears to have an effect on string tension employed in connection with the other sections of the arm. In a theoretical analysis, Hemami notes a number of positions which the proposed structure cannot achieve; limitations that are inherent in the approach of a combination flexible skin and string type control arrangement. Although recognizing the desirability of a flexible robotic arm, the design addressed in the article does not appear to achieve a practical structure for satisfying that end.

The present invention achieves a practical and operative multi-section robotic arm that is capable of being positioned over no less than a hemisphere of three dimensional locations; does not rely upon and is not limited by the characteristics of a bellows like support skin and is not limited by and does not require use of complicated tensioned string control arrangements, even though the present invention can also use strings as actuators, if necessary.

The subject of manipulators is also partially addressed by Lambert in U.S. Pat. No. 4,651,589 granted Mar. 24, 1987 for a polyarticulated retractile mechanism. In the Lambert patent a mechanism is formed of elemental units each containing two spaced plates supported at at least three locations on each plate by foldable support arms extending between the two plates. In one device the arms contain end and intermediate ball and socket joints and a hinge connection at the bottom arm end so as to be foldable outwardly of the plate.

In a second embodiment illustrated in the Lambert patent the support arms are hinged at each end and contain an intermediate ball and socket joint and are foldable outwardly at the plate. One of the arms is intended to be driven by an actuator which is a servo controlled motor. This positions the two plates relative to one another. As shown in Lambert the support arms extend outside the area defined by the top and bottom plates. The exact nature of the control and mode of operation is not prescribed and although Lambert appears to describe some elements and results that he expects that structure to achieve, the exact operation of the mechanism and scope of the mechanism's capability appear unexplained and left to conjecture.

In Inoue U.S. Pat. No. 4,607,578 granted Aug. 26, 1986 a positioning mechanism is illustrated that supports and positions a table on a base using three complicated pantagraph mechanisms driven by motors. The table is supported at three spaced locations by the arms of the pantagraph mechanisms and may be positioned at any angle. Although the table structure is not a robotic arm, Inoue illustrates further the positional flexibility obtained from three spaced movable supports.

Other patents describe structure generally related to the present subject to which the reader may make reference as desired: U.S. Pat. Nos. 4,393,728 Larson granted July 19, 1983; 4,494,417 Larson granted Jan. 12, 1985; 3,712,481 Harwood granted Jan. 23, 1973; and 4,621,965 Wilcox granted Nov. 11, 1986.

A principal object of the present invention is to provide a robotic manipulator or positioning device, such as a robotic arm, that achieves a large number of shapes and end positions. A further object is to provided a robotic manipulator arm 15 construction that is able to curve or snake around obstructions or complicated contours and which can be held or fixed at that shape. Another object of the invention is to provide a versatile mechanical manipulator capable of use as robotic hands, legs and arms. It is a still further object to provide a positioning device of simple construction that is easily manufactured with interchangeable parts using mass production manufacturing techniques. The robotic arm presented is particularly adapted to control by computer, a decided advantage. A still additional object is to enable building a robotic manipulator that could be applied as an artificial prosthetic leg or arm, complete with fingers, for amputees; with artificial intelligence and coupling directly to neurons in the amputated stub the arm can be controlled entirely by brain function.

SUMMARY OF THE INVENTION

A novel positioning device, such as a robotic arm or finger member, contains a plurality of substantially identical relatively rigid disks or platforms that define multiple joints in the arm structure. The platforms are spaced and angularly oriented relative to one another by mechanical coupling and positioning means carried by and within the boundary of the platforms, such means being selectively individually operated or controlled. The coupling means serve also as a stabilizer to prevent sideways movement of any one platform with respect to an adjacent platform, thereby insuring rigidity of the device at any assumed shape, while allowing the flexibility of changing the shape.

In an additional aspect, the positioning device is ensleeved by a sheath of flexible material that serves as a skin protecting the internal components from external contaminants, such as dust, radiation, corrosive chemicals, and the like. In a still further specific aspect of the invention the positioning and coupling means includes actuator devices, such as solenoids, motors, fluidic pneumatic cylinders, shape memory alloys, piezoelectric materials or even strings, at each of three corresponding locations on adjacent platforms; and further contains a series of three stabilizer rods, containing ball and socket joints intermediate their length, with the rods hingedly connected at their ends to adjacent platforms for precluding relative sideways movement of those respective platforms, thereby allowing the arm to be structurally rigid at any pre-set shape.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIGS. 6a, 6b, 6c, 6d and 6e illustrate alternative forms of actuators that are useful in the invention;

DESCRIPTION OF THE PREFERRED EMBODIMENTS

Figures 1A, 1B:
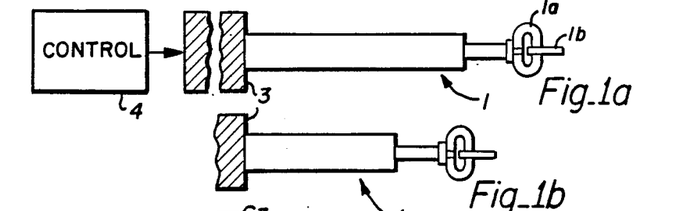
FIGS. 1a through 1c symbolically illustrate a robotic system containing the preferred embodiment and a few configurations in which the arm may be positioned.
Figure 1C:
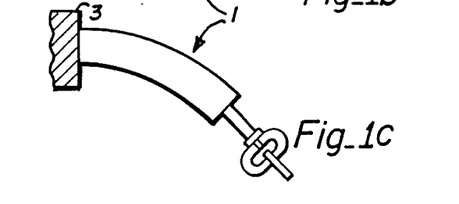

One robotic arm system containing the invention is illustrated pictorially and in block diagram form in FIGS. 1a through 1c. As depicted in FIGS. 1a through 1c, a robotic arm 1 is positionable to an infinite variety of shapes and end positions, a few of which are illustrated. The arm contains a suitable attaching grip, 1a, of any conventional structure attached to an end. The grip is illustrated as gripping and carrying an object, such as a piece of material, 1b. The arm may be fully extended outright, as represented in FIG. 1a; may be contracted to a shorter length or distance as represented in FIG. 1b; and is positionable to form a smooth curve positioning the end disk at a 45 degree angle to the vertically oriented base 3 as represented in FIG. 1c, all of which is accomplished by appropriate selective energization of the individual actuators carried by the platform later herein after described in greater detail under control of a control circuit 4 represented in block diagram form.

Figure 2:
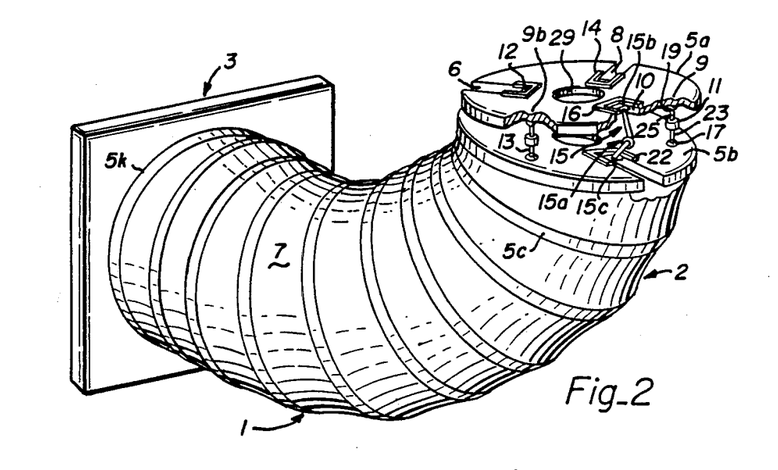
FIG. 2 is a partial perspective illustration of a preferred embodiment.

Reference is made to FIG. 2 in which the positioning device or robotic arm 1 is partially illustrated pictorially in perspective. The arm is attached at one end to a base plate 3 from which the arm smoothly upwardly curves and positions an end disk or platform 5a horizontally. The arm illustrated includes approximately ten separate disks or platforms 5a through 5k, as variously termed, only the top two of which 5a and 5b are visible in this figure. The disks of the arm are covered by an ensheathing skin or sleeve 7 of flexible material, such as plastic, the right end of which material is cut away in the figure to uncover in part the two uppermost platforms 5a and 5b. As is apparent any number of platforms may be incorporated within the arm, the number being limited only by the strength of materials to support the weight of a large number in an environment with gravity, but which is virtually unlimited in number in a zero gravity environment, such as in outer space.

In this embodiment disk 5a is substantially identical in size and shape to disk 5b as are all of the other disks covered by the sheath. For purposes of illustration, a portion of disk 5a is cut away at 9 and 9b in order to provide a view of actuators, 11 and 13, which in one specific embodiment are electromechanical actuators, and stabilizer member 15, which is one of the three stabilizer members coupled between and located within the area defined by the two disks. The actuators can be any one of the several types described later in this specification.

As illustrated, actuator 11 includes extending links or shafts 23 and 25 and ball and socket joints 17 and 19 in series with the shafts. The shafts are anchored or coupled through the ball joints to the platforms 5b and 5a, respectively. Movement of shafts 23 and 25 into and out of the actuator changes the spacing between disks 5a and 5b at that location, as becomes more apparent from the description of operation that follows in this specification. Actuator 13 likewise includes the shaft and ball and socket joints connected between the adjacent disks at a location spaced from the position at which actuator 11 is anchored. The third actuator, not visible in this figure, is located at a third position spaced from the other two locations.

As illustrated, the stabilizer members and the actuators are located within the area bounded by the peripheral edge of the underlying and overlying platforms. In this embodiment, the locations on the disks to which the actuators are physically coupled form an equilateral triangle; that is, the actuators are spaced apart equally on the disk for symmetry and interchangeability and serve to define three positions of mutual coupling or support between the adjacent platforms. However, the actuators can be located at any three locations, so long as they are not in a straight line. This flexibility of locating the actuators anywhere can be extended to the limit wherein the stabilizer bar member is made to rotate about its hinged axis by a motor, as described in connection with FIG. 5, discussed hereinafter.

Three radially extending slots 6, 8 and 10 are spaced equi-distant within the disk in between the three actuators. Hinge joint seats 12, 14 and 16, respectively, are located within slots 6, 8 and 10. The hinge joints in these seats allow for pivotal or hinged movement.

Platform 5b underlies platform 5a and is of a like construction. Platform 5b includes corresponding hinge joint members only one of which 22 is visible in this figure. Here again, the three hinges on each disk lie on the centers of the equilateral triangle sides. However, as those skilled in the art recognize, the arm will work as well even if this triangle is other than an equilateral triangle.

It is noted that the hinge joint member in the underlying disk includes a like member stemming from the under surface to a position to the next most adjacent disk or platform 5c. That member, however, is not illustrated in this figure, but is better illustrated in FIGS. 3a and 3b.

The stabilizer bar 15 includes an intermediate ball and socket joint 15a from which stems a shaft which is connected to the hinge 15b of the upper platform and a second shaft which is connected to hinge joint 15c of the underlying platform. A like coupling and stabilizing bar arrangement is included at those locations of the disk represented by the hinge seat 12 and 14, the details of which are not visible in FIG. 2. As becomes apparent to those skilled in the art, without the hinged stabilizer bars or an equivalent, the use of only ball and socket joints ordinarily permits a sliding movement between the two adjacent platforms, due to the hemispheric freedom of movement inherent in the ball and socket joints. As the platforms move sideways relative to one another, the ball would simply rotate in the socket. The stabilizer bars prevent that undesired sideways movement.

The hinge joints permit movement in only one direction: Each hinge joint is arranged for rotational movement about its respective hinge axis and the three hinge axes are oriented in different directions, approximately 120 degrees apart for the equilateral triangle configuration. Thus should a sideways force be exerted at any peripheral location upon one platform relative to the underlying platform, even though any one hinge joint may be free to hingedly pivot, the axes of the two remaining hinge joints are such as to resist and oppose that movement, making such undesired sideways movement impossible.

Figure 3A:
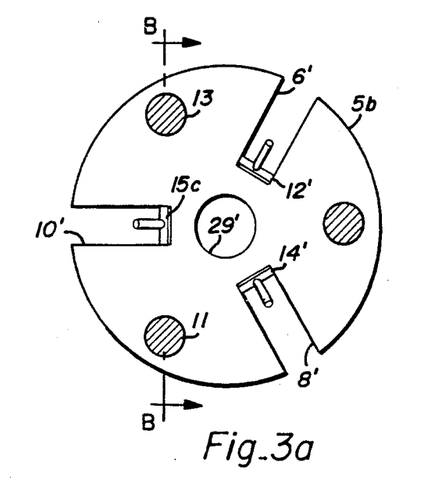
FIG. 3a is a side section view of two elements used in the embodiment of FIG. 2
Figures 3B, 4:
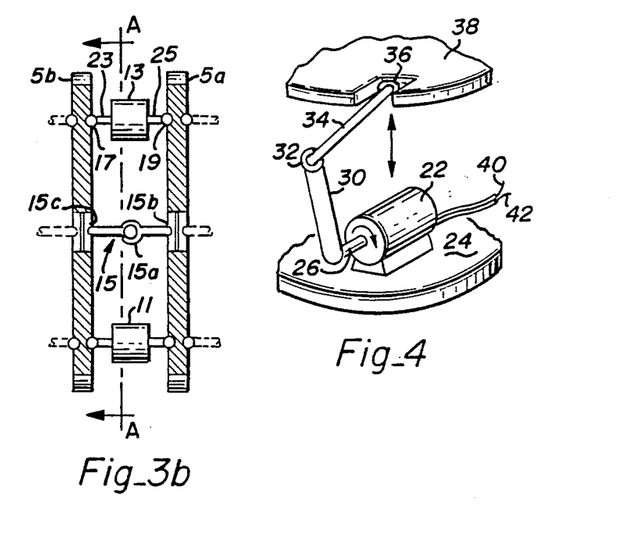
FIG. 3b is a section view taken from the top of FIG. 3a, each of which is drawn to a larger scale than FIG. 2.
FIG. 4 partially illustrates in perspective an alternative actuator that uses a motor device.

The illustration of FIG. 3a provides a top view of one of the platforms used in FIG. 2 taken along the lines A—A in FIG. 3b and shows the location of the individual actuators 11 and 13, the radially oriented slot 10', and the central opening 29'. The elements in disk 5b depicted in the view that correspond to the elements of the like adjacent disk 5a are identified by the same numeral, primed. A partial section view of the arm taken along the lines B—B in FIG. 3a is presented in FIG. 3b and better illustrates from a side elevation the two adjacent platforms, two of the actuators and the relationship and mounting of associated stabilizer members and actuators in adjacent platforms. These views are drawn to a larger scale than shown in FIG. 2 in order to provide greater clarity. The platforms may be of metal, such as aluminum, or other material that is strong and rigid. It is noted that the ball and socket joints in FIGS. 2, 3a and 3b can be replaced by equivalent universal joints such as discussed in connection with FIG. 7.

Each portion of the arm portions defined by two platforms or disks is sometimes referred adjacent to as an arm "section" for convenience of reference or description. In that context the platform that defines a top end of one such section also serves in common as the bottom end of the next most adjacent arm section. In moving that top platform relative to the bottom platform of a given section by the means earlier described so as to change the spacing and angular orientation of the one platform relative to the other, collectively referred to as "position", the length and angular orientation or position of the next most arm section, that in which the moved platform serves as the bottom most platform, is changed relative to both the arm section containing the actuator and relative to the base end of the entire multisection arm.

Each actuator illustrated in the preceding embodiment is one of several types possible. One type is depicted in FIG. 4 and is an electrical motor driven device. As shown a motor 22 is mounted upon a platform 24, partially illustrated. The motor contains a driven shaft 26, an arm 30, ball joint 32, extending arm 34 and ball joint 36 connected to a second platform 38, partially illustrated.

Electrical leads 40 and 42 are provided for supplying power through a controller, not illustrated. With power supplied to motor 22, the shaft rotates permitting the arm 30 to raise, which in turn lifts platform 38 vertically at that location relative to the underlying platform. Should power to the motor continue, the shaft will eventually allow the arm to move downwardly, so that the two platforms are moved closer together at that location. With a motor driving a worm gear screw reduction mechanism, when power is removed the shaft remains at that location upon de-energization of the motor. In this manner the spacing between the platforms may be adjusted or controlled through application of electrical current of a preset duration and that spacing is fixed.

The ball joints 32 and 36 allow the distance between the two platforms to be changed and also allow for different orientations of the platforms. It is understood that like motor mechanisms are substituted for the two other actuators on the lower platform so that three such positioners may adjust the relative position of the axes of the two platforms. Moreover, the three stabilizer bars are included in the arrangement though not illustrated.

With the motor type positioners the adjustment between adjacent platforms may be finely adjusted.

Figure 5:
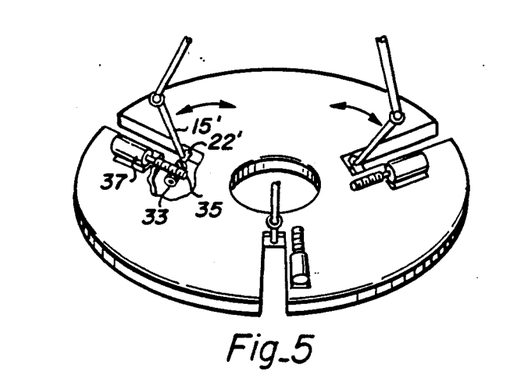
FIG. 5 illustrates an alternative construction in which the arm's actuators are an integral component of the stabilizer rod mechanism.

An alternative structure combines the actuator and the stabilizer into a single assembly as is shown in FIG. 5 to which reference is made. The stabilizer bar 15' in FIG. 5 is attached to shaft 22' of the hinge. This shaft is coupled to a gear 33 driven by a worm screw 35, which in turn is coupled to a motor drive 37. Hence when the motor turns, the stabilizer bar rotates about its axis. The same electromechanical arrangement is repeated at the other two hinges. Therefore, by controlling and fixing the angular positions of the three stabilizing bars on any platform, the relative distance and orientation of the adjacent platform connecting the three stabilizer bars by means of the three ball and socket joints can be controlled and fixed. In this simplified embodiment, the only supports between any two platforms are the three stabilizer bars.

However, the structure of FIG. 2 which contains both actuators and stabilizer bars possesses advantage over the alternative structure illustrated in the embodiment of FIG. 5. In the former structure all of the loading or force is axially directed; the force on the actuators is axial and the sliding force if any is translated to an axial force on the hinge joints associated with the stabilizer bars. In the embodiment of FIG. 5 in which the hinges are driven, the forces are translated to a torque on the hinge and associated driving gears, such as gear 33 in FIG. 5. Since structural materials withstand axial loads better than torque loads, the embodiment of FIG. 2, and, of course, FIG. 4, has greater strength than the arm constructed in accordance with FIG. 5.

Figures 6, 7, 8, 9:
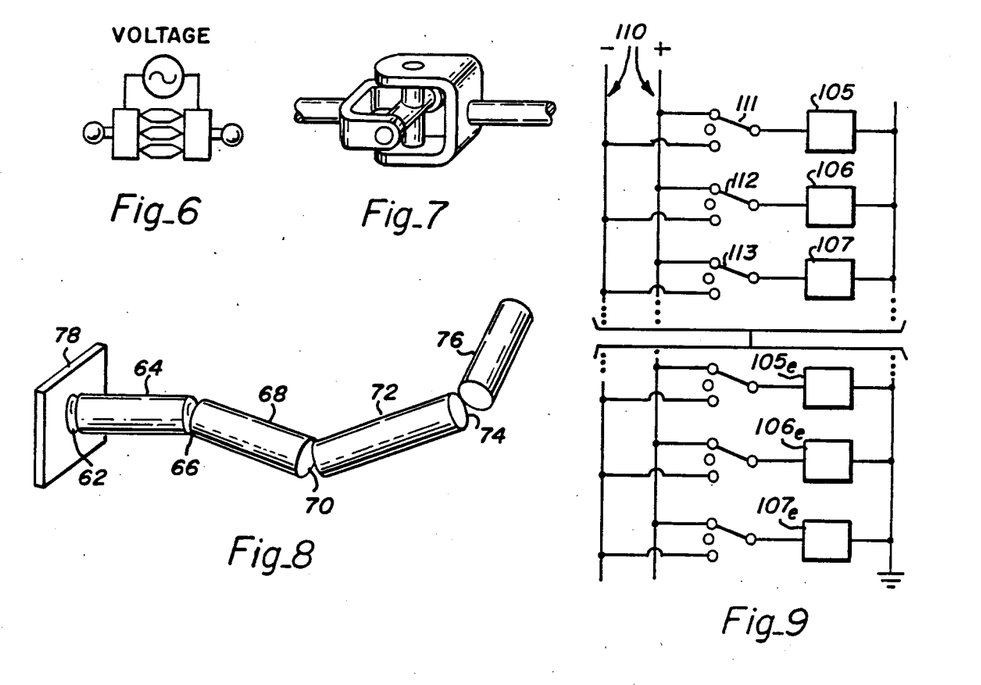
FIG. 7 illustrates a universal joint which can be used in place of the ball-and-socket joint in the described combination.
FIG. 8 illustrates a related construction for the arm in which the platforms are formed of elongate cylindrical tubes.
FIG. 9 is an electrical circuit diagram illustrating one type of control used with the preferred embodiment.
Figure 6A:
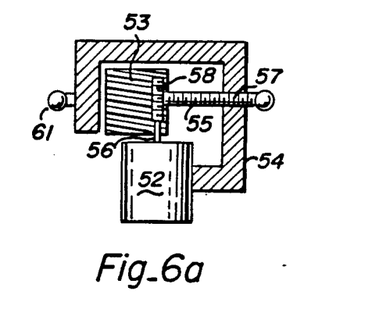
Figure 6B:
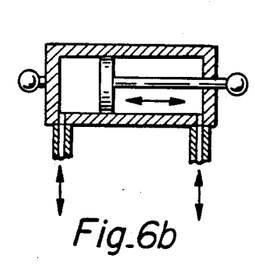
Figure 6C:
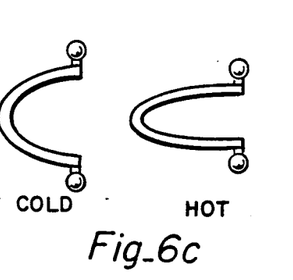
Figure 6D:
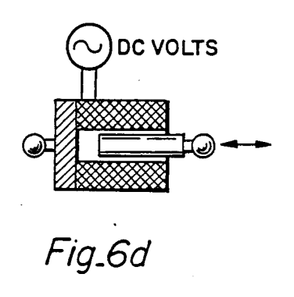

A motor driven actuator containing a gearing mechanism of the type earlier referred to is partially pictorially illustrated in FIG. 6a. A reversible DC motor 52 is mounted in a frame 54. A rotatable shaft 56 driven by the motor contains a worm gear 58 that engages the teeth of a wide gear 53 that in turn is coaxially connected with a screw shaft 55 that is mounted in a threaded passage 57 in frame 54. The other end 61 of the shaft drives the rod in FIG. 4.

The actuators in the present embodiment can be any one or combinations of many known forms such as symbolically illustrated in FIGS. 6a through 6e including: (1) Other electrically driven actuators, such as the solenoids of FIG. 6d, motors with gears represented in FIG. 6a, piezoelectric crystals represented in FIG. 6e; (2) Heat driven actuators, such as shape memory alloys, for example, "Nitinol" represented in FIG. 6c; and (3) Fluid pressure (gas or liquid) driven actuators, such as piston-cylinder devices represented in FIG. 6b. As is apparent the actuators may be of many kinds as fit within and perform the functions described. These devices are known to those skilled in the art and need not be described in detail.

Mention was made to the use of ball and socket type joints, which is preferred, although a less preferred equivalent may be substituted for that joint, such as the universal type joint illustrated pictorially in FIG. 7. The universal joint though more complex is still relatively simple in structure and is inexpensive.

An alternative construction provides a manipulator arm which is segmented and cannot form the more smoothly defined curves described in connection with the first embodiment. This alternative is presented in FIG. 8 which as shown contains the appropriate pairs of disks which form a moveable joint. Further the embodiment contains straight, relatively rigid lengths of a tubular member intermediate those disk pairs. This includes the disk pairs identified as 62, 66, 70 and 74 pictorially represented in the figure and tubular sections 64, 68, 72, and 76, supported from a base 78.

A particular structure of the disks incorporated in the joints of this embodiment is essentially the same as that described in the preceding embodiments, except that the underside of one of the disks is not movable and hence that disk need not contain the cut out sections and visible joints. That counterpart section is at the other end of the tube. If the length of the tube were contracted to a small amount so that the left and right ends were effectively consolidated into a single disk, the structure of the preceding embodiments results.

FIG. 9 schematically illustrates an electrical circuit for selective control of electrically driven actuators. For example, the actuators associated with the lower most disk 105, 106 and 107 can be operated by switches 111, 112 and 113. Likewise the actuators 105e, 106e and 107e associated with the end disk are illustrated connected via cabling through to the control circuits. For convenience the remaining actuators and associated control circuits are omitted and are represented by the dash lines. The control circuit in its simplest form includes a source of power 110 and a series of switches 111, 112 and 113 which open and close a circuit to the associated actuator to furnish electrical current in a path extending from the power source through the switch and actuator and back through the cabling to a common electrical ground. By judicious operation of the switches associated with all of the actuators acquired through practice, the arm may be made to bend or curve in the manner previously described.

It is apparent that at a minimum at least four wires are required for each joint within the robotic arm. Hence the cable in this kind of control circuit must include a number of wires of four multiplied by the number of joints. An arm with ten joints would thus require a cable containing at least forty insulated conductors and the center clearance hole in the bottommost disk must be sufficiently large to allow passage of the requisite number of wires.

Other arrangements for the control circuitry serve to reduce the number of wires required in the control cables can include arrangements using multiplexing techniques, such as is the subject of a related invention and patent application. In that multiplexing arrangement the actuators are connected to circuits which allow the circuits to operate momentarily at an appropriate time to receive the appropriate command signals. In effect, multiplexing techniques divides up a single electrical conductor into a plurality of time spaced channels and only one of the circuits is activated at a given time.

Brief reference is again made to the illustration of FIG. 3b. A position sensor 18, which is included in an alternative embodiment of the invention, is represented in dash lines. Three such sensors are provided, one of which is associated with a corresponding one of the three actuators. The position sensors may be of any known construction, the details of which are not important to a description of the invention. In such an embodiment, the position sensor provides electrical signals or characteristics that represents the disk to disk spacing at the location of the actuator with which the sensor is associated or paired.

Each position sensor is coupled by electrical conductors, not illustrated, in a known manner to the control circuits at the operators station at which the electrical leads are connected to suitable known monitoring and/or display apparatus to permit visual read out and/or are connected to the control circuits for the arm to permit automatic interrogation of the respective sensor's position information. The latter arrangement allows the control circuits to act in response to the sensor's position information.

As those skilled in the art appreciate, alternative position sensor arrangements may be used in as much as the invention is not limited to any specific kind or type of position sensor. For example, position sensors that measure angle may be included to measure the angle of the hinge in the embodiment which uses a hinge so that the spacing is determined by a trigonometric calculation depending on the length of the rod associated with the hinge at that joint.

Figure 10:
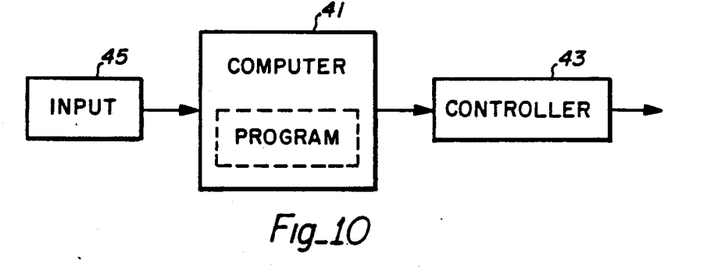
FIG. 10 illustrates in block diagram form a computerized controller for distributing position commands to the elements in the embodiment.

The elementary control and power circuit described in FIG. 9 in connection with the actuators may be replaced by circuits of greater complexity and sophistication, such as a processor or computer. As represented in block diagram form in FIG. 10, a computer or processor 41 as variously termed, contains a program and is connected with an interface or controller circuit 43. An input device 45, such as a keyboard or joystick or any combination, allows the operator who is controlling the arm to supply the input to the computer. In turn the computer translates the input according to the installed program, whether hardwired in read only memory or as software or a combination thereof, into the output signals required to energize selected actuators in the arm of the embodiment of FIG. 1. The computer and input devices are of conventional structure and need not be described in detail. In accordance with the principles of the present invention, the computer is programmed in a variety of ways to allow the arm or fingers to be positioned.

The computer is suitably programmed to (a) interrogate the input device for input information keyed in by the operator; (b) interpret the input; (c) determine the steps, namely the selection and operation of the actuators as will accomplish the movement of the arm to the specified location, if the end location is specified, or if movement from an existing location is specified. In this connection, the program includes a subroutine which checks to determine the current location of the arm end (and hand position) as stored in registers in the computer. This establishes a position from the original base line; executes another subroutine that determines and or calculates the final end position based on the interpreted input; either calculates the position for each actuator in the arm to attain that position or alternatively calls upon a memory bank containing the actuator position information associated with a specified position; and executes an output routine that outputs this information to the controller interface, either as complete data; i.e. a parallel output, in a form that is interpreted by the actuator controller or alternatively sequences the information out to the interface serially so that the controller may act on each set of actuator data on a one at a time basis.

A controller is a circuit device which translates the computer's output signals into electrical power for controlling a peripheral accessory device. Examples available of controllers include the controller "cards" which are installed within the "slots" of personal computers, such as those computers sold by the IBM Corporation, allowing the personal computer to control motors, servos and the like electrically controlled equipment. In effect, software commands are converted by the controller to electronic power pulses that drive the accessory device.

The computer and the controller also share a common clock, the electrical oscillator that supplies the timing pulses in the computer system. This allows the two devices to have synchronized timing, which is necessary for the control and multiplexing function elsewhere herein described.

The controller in this embodiment acts directly to energize the actuators, if the actuators are wired separately as presented in the elemental circuit of FIG. 9. Otherwise the controller converts the individual actuator data into the form required by the control signal communication circuit, such as a multiplexing circuit, which is the subject of a related application. With the computer, a wide number of options is thus possible within the framework of the disclosed system.

The details of those programs may be determined hereafter empirically and may be in any level of language. For example, the upward movement on the joystick will cause the arm to move up. A command entered into a keyboard, e.g. "go to point x, y, z", causes the computer to provide the appropriate outputs to the actuators that allows the end of the arm to move to that position.

Figure 11A:
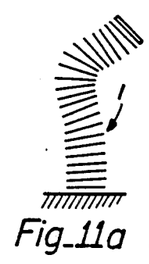
FIGS. 11a through 11c illustrate various configurations which the arm of the preferred embodiment may assume in positioning the end disk.
Figure 11B:
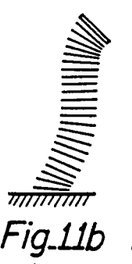
Figure 11C:
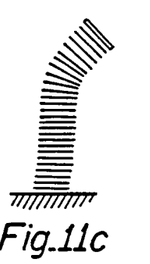
Figure 12:
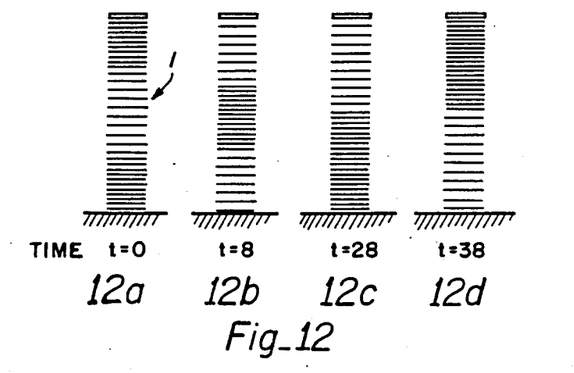
FIGS. 12a through 12d illustrate symbolically systolic motion as may be accomplished in a preferred embodiment.

As is apparent, the arm may be operated to achieve a variety of curves in order to appropriately position its end as desired by the operator who is controlling its movement and, ultimately, the position. As depicted in FIG. 11a, 11b and 11c, the end disk in each illustration is positioned at the same angle with respect to the horizontal and the same distance from the midpoint of the base member. The path or curve assumed by the multi-section arm 1 in so positioning the arm's end is different in each case. The configurations illustrate the flexibility of the invention; it allows the arm to be routed around those structures or objects to achieve the proper position of the arm's end. This is most useful in situations in which the arm is used to assemble or position members in a complex mechanical environment.

The versatility of application is apparent. The invention has capability for systolic motion. This is represented in FIGS. 12a through 12d, which illustrates the position of the various joints or platforms which compose the robotic arm at different intervals of time. In each figure the end disk is maintained constant in angular orientation and position. The intermediate disks may be moved closer together while others of the disks in the series are moved further apart so that the net result is that the end disk does not move. Hence, systolic motion is provided.

Figure 13:
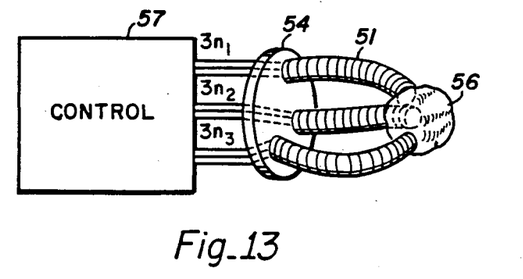
FIG. 13 illustrates robotic fingers and a hand constructed using the principles of the invention.

The flexible robotic arm positioning device described may be mounted with additional structures of like construction to a common base, such as illustrated in FIG. 13. In this figure, three manipulators 50, 51 and 52, which are of identical construction to the embodiment previously described, are fastened to three different locations upon a base or disk 54. As illustrated the positioning members form three "fingers" and the entire arrangement may be referred to as a robotic "hand". As illustrated the fingers are positioned so as to hold a small object, such as a rock 56 between the fingers. For purposes of this illustration, the control circuit for the actuators is illustrated simply by the block labeled control 57. The control may be of the simplest form such as the switch arrangement of FIG. 9 or be of the more sophisticated form of computer controlled arrangement described in FIG. 10. As an additional embodiment the base 54 may serve as the end disk of a much larger robotic manipulator arm so as to form an "arm" containing a "three fingered hand". The control thus serves to control all of the arm sections, including the "fingers".

The small arms that are referred to as "fingers" are part of that overall arm construction and are subsumed within that description by the reference to arm sections. Thus the control input may relate to the positioning of the three fingers to accomplish a specified configuration or position for those fingers, either concurrently or separately with the configuring of the larger manipulator arm that carries those fingers.

From the foregoing description of the construction of the multisection arm it is evident that power is distributed spatially over the arm's length, which is an advantage. The arm may be built with identical mass produced components, allowing for lower manufacturing costs and easier repair should any element be broken. The structure is easily scaled in a wide range of sizes. Any critical disk pair moreover can be made stronger than other disk pairs by incorporating a stronger more powerful actuator on the disk pair. As desired the disk pairs may be made consecutively smaller in size to provide a tapered profile. And the arms may be easily and accurately controlled by a computer as was earlier described.

It is believed that the foregoing description of the preferred embodiments of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. In a mechanical positioning device adapted to manipulate and move objects with the objects providing a mechanical load on the positioning device that may include axial and torsional load forces, comprising:

a series of at least two platform means; said platform means being spaced apart with one of said platform means including means for gripping an object and with each of said platform means having an axis;

position control means for bearing the axial and torsional loads imposed on on said platforms and positioning each of said platforms in said series relative to one another, comprising:

stabilizer means disposed between adjacent ones of said platform means in said series of platform means, each said stabilizer means further comprising:

at least three arm assemblies located spaced essentially evenly about the center of said platform means;

each of said arm assemblies including further: a pair of arms, joint means and a pair of anchor means; each arm in said pair of arms being joined together at one end by said joint means to form an articulated arm with said joint means permitting universal movement between said arms of said arm pair and with the remaining ends of each arm in said pair being moveably attached to respective adjacent ones of said platform means by a corresponding one of said associated pair of anchor means with each said anchor means being adapted to permit the associated pair of arms to rotate in a plane generally normal to the surface of said adjacent ones of said platform means;

actuator means spaced from said stabilizer means and being disposed between adjacent ones of said platform means in said series of platform means for moving a platform means relative to an adjacent platform means;

said actuator means being capable of sustaining a longitudinally directed force applied by said mechanical load and being incapable of resisting rotational movement of one of said platform means relative to the adjacent one of said platform means applied by said mechanical load;

whereby axially directed forces and torsional forces applied to the positioning device by the load are separately selectively absorbed, respectively, by said actuator means and by said stabilizer means.

2. In a mechanical positioning device the combination comprising:

a series of platform means; said series being at least three in number and said platform means within said series being arranged in serial order spaced from and adjacent one another;

controllable positioning means carried by said platform means for coupling together and individually selectively angularly orienting the axis of and individually controlling the spacing between each said platform means and the next most adjacent platform means in said series of platform means;

said positioning means, including:

first, second and third positioner means supported upon each platform means, intermediate an end one of said platform means, said positioner means being coupled to three spaced anchor locations on each said adjacent platform means and being located entirely within the space defined by said platform means by which said positioning means is carried and the next most adjacent platform means to which said positioner means is anchored, each said positioner means for independently spacing the distance between corresponding locations on said associated two adjacent platform means;

control means coupled to said positioning means for selectively controlling said positioning means to selected positions for each of said platform means relative to the adjacent platform means, said control means including control lead means coupled through at least intermediate ones of said platforms means; whereby the position and orientation of the end platform is controlled; and wherein each said positioner means comprises: motor means of the electrical servo mechanism type; said motor means including: a rotatable shaft; and reduction gears coupled to said shaft for rotating said shaft to an angular position responsive to energization of said motor means, whereby upon deenergization of said motor means said shaft remains in the rotational position to which moved responsive to energization of said motor means and resists torque applied to said shaft; each said positioner means further including: a pair of rods, said rods being joined together by a center joint means for permitting angular movement therebetween, said center joint being capable of rotation in any direction; and joint means at one end of one of said rods; a rotatable driven joint, including gear means, at one end of the other one of said rods; said motor means including gear means for engaging said gear means of said rotatable drive joint for rotating said associated one of said rods, whereby said rods may be angularly positioned relative to one another;

said platform means comprising a disk shape geometry; and at least intermediate ones of said platform means including a generally circular periphery and a central passage with said control lead means extending through said central passage, and with said positioner means being coupled in circuit with said control lead means.

3. The invention as defined in claim 2 wherein said platform means further includes three radially directed slots, said slots being equally angularly spaced and extending inwardly radially from the periphery of said platform means a distance less than the radius of said platform means; and wherein each said slot includes at least one seat for seating either of said end joint means or said rotatable driven joint of one of said two rods of a corresponding one of said first, second and third positioner means.

4. The invention as defined in claim 3 wherein said center joint comprises ball and socket joint means.

5. In a mechanical positioning device the combination comprising:

a series of platform means; said series being at least three in number and said platform means within said series being arranged in serial order spaced from and adjacent one another;

controllable positioning means carried by said platform means for coupling together and individually selectively angularly orienting the axis of and individually controlling the spacing between each said platform means and the next most adjacent platform means in said series of platform means;

each said positioning means being located entirely within the space defined by said platform means by which said positioning means is carried and the next most adjacent platform means to which said positioner means is anchored;

said positioning means, including:

first, second and third positioner means supported upon each platform means, intermediate an end one of said platform anchor locations on each said adjacent platform means and being located entirely within the space defined between adjacent platform means in said series, each said positioner means for independently spacing the distance between corresponding anchor locations on an associated two adjacent ones of said platform means to which said positioner means is coupled;

control means coupled to said positioning means for selectively controlling said positioning means to select positions for each of said platform means relative to the adjacent platform means, said control means including control lead means coupled through at least intermediate ones of said platforms means; whereby the position and orientation of the end platform means is controlled; and wherein each said positioner means comprises: electrical actuator means for providing a linear mechanical motive force to set the spacing between said associated anchor locations responsive to electrical, energization; ball and socket joint means connecting said electrical actuator means to each of said associated adjacent ones of said platform means, whereby said positioner means is incapable of preventing relative sideways movement between said associated adjacent ones of said platform means a plurality of stabilizer means for preventing relative sideways movement between any two adjacent ones of said platform means, with three stabilizer means of said plurality being located entirely within the space defined between and coupled to adjacent ones of said platform means; said stabilizer means being evenly angularly spaced about said platform means and interspersed between said positioner means; each of said stabilizer means comprising: a pair of rod-shaped links; first and second hinge means connected to a first end of each said link of said pair, respectively, and first and second ball and socket joint means connected to a remaining end of each said link of said pair, respectively, with said links in said pair being connected together by said ball and socket joint, whereby said ball and socket joint means is located intermediate said first and second hinge means;

said first hinge means being connected to one platform means for permitting only pivotal movement of the associated link and said second hinge means being connected to said adjacent platform means for permitting only pivotal movement of the associated link of said pair of links; whereby said stabilizer means prevents any one of said platform means from moving sideways relative to an adjacent one of said platform means.

6. The invention as defined in claim 5 wherein said platform means comprises a disk shape geometry and further includes three radially directed slots, said slots being equally angularly spaced and extending inwardly radially from the periphery of said platform means a distance less than the radius of said platform means; and wherein each said slot includes at least one seat for seating a respective hinge joint means associated with one of said two links of a corresponding one of said first, second and third stabilizer means.

* * * * *